(12) United States Patent
Johansen et al.

(10) Patent No.: US 12,234,807 B2
(45) Date of Patent: Feb. 25, 2025

(54) REDUCING NOISE EMISSIONS OF A WIND TURBINE

(71) Applicant: VESTAS WIND SYSTEMS A/S, Aarhus N (DK)

(72) Inventors: Nicolaj Winther Johansen, Hinnerup (DK); Mranal Gupta, Tilst (DK); Kaj Dam Madsen, Aarhus C (DK); Brian Ank Mertz, Aarhus C (DK); Claus Thy Henningsen, Hornslet (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 4 days.

(21) Appl. No.: 18/250,954

(22) PCT Filed: Oct. 26, 2021

(86) PCT No.: PCT/DK2021/050316
§ 371 (c)(1),
(2) Date: Apr. 27, 2023

(87) PCT Pub. No.: WO2022/089703
PCT Pub. Date: May 5, 2022

(65) Prior Publication Data
US 2023/0400011 A1    Dec. 14, 2023

(30) Foreign Application Priority Data
Oct. 27, 2020    (DK) .......................... PA 2020 70710

(51) Int. Cl.
*F03D 7/02*    (2006.01)
(52) U.S. Cl.
CPC ........ *F03D 7/0296* (2013.01); *F05B 2260/96* (2013.01); *F05B 2270/402* (2013.01); *F05B 2270/504* (2013.01)

(58) Field of Classification Search
CPC ................ F03D 7/0296; F05B 2260/96; F05B 2270/402; F05B 2270/504; F05B 2270/327; F05B 2270/333; Y02E 10/72
See application file for complete search history.

(56) References Cited

U.S. PATENT DOCUMENTS

| 2008/0164091 A1 | 7/2008 | Kerber |
| 2010/0133818 A1 | 6/2010 | Kinzie et al. |

(Continued)

FOREIGN PATENT DOCUMENTS

| DE | 102016121978 A1 | 5/2018 |
| DE | 102017222920 A1 | 6/2019 |

(Continued)

OTHER PUBLICATIONS

PCT, Notificaton of Transmittal of the International Search Report and the Written Opinion of the International Searching Authority, or the Declaration for Application PCT/DK2021/050316 dated Feb. 16, 2022.

(Continued)

*Primary Examiner* — Joseph Ortega
(74) *Attorney, Agent, or Firm* — Patterson + Sheridan, LLP; Gero G. McClellan

(57) ABSTRACT

The invention provides a method of reducing noise emissions of a wind turbine. The method includes receiving data indicative of wind conditions in the vicinity of the wind turbine, and determining an operational set point signal in accordance with a desired operation of the wind turbine, the operational set point signal being determined based on the received data. The method includes applying a perturbation signal to the operational set point signal to obtain a modified operational set point signal, and controlling operation of the wind turbine using the modified operational set point signal to reduce noise emissions of the wind turbine. The perturbation signal is applied such that the modified operational (Continued)

set point signal has greater temporal variation than the operational set point signal.

20 Claims, 5 Drawing Sheets

(56) References Cited

U.S. PATENT DOCUMENTS

| | | | |
|---|---|---|---|
| 2010/0133819 A1 | 6/2010 | Kinzie et al. | |
| 2015/0071778 A1 | 3/2015 | Delport et al. | |
| 2019/0331093 A1* | 10/2019 | Qvist | F03D 7/048 |
| 2021/0207585 A1* | 7/2021 | Caponetti | F03D 7/045 |

FOREIGN PATENT DOCUMENTS

| | | | |
|---|---|---|---|
| EP | 2626550 A1 | 8/2013 | |
| EP | 3587802 A1 | 1/2020 | |
| WO | 2010061255 A2 | 6/2010 | |
| WO | 2016058610 A1 | 4/2016 | |
| WO | WO-2019129332 A1 * | 7/2019 | F03D 17/00 |
| WO | 2020125893 A1 | 6/2020 | |
| WO | 2022089703 A1 | 5/2022 | |

OTHER PUBLICATIONS

Danish Patent and Trademark Office, 1st Technical Examination including The Search Report and Search Opinion for Application PA 2020 70710 dated: Mar. 25, 2021.
European Patent Office, Intention to Grant for European Patent Application No. 21801828.1-1002, dated Jun. 5, 2024.

* cited by examiner

REDUCING NOISE EMISSIONS OF A WIND TURBINE

FIELD OF THE INVENTION

The invention relates to controlling operation of a wind turbine and, in particular, to reducing noise emissions of the wind turbine by applying a perturbation signal to a desired or optimal operational set point signal of the wind turbine.

BACKGROUND

Wind turbine control technology is used for optimisation of power and minimisation of loads. Many different loads act on a wind turbine, such as aerodynamic, gravity, centrifugal and inertial loads. Changes in the loads experienced by a wind turbine may be caused by wind conditions in the vicinity of the wind turbine, e.g. wind shear or turbulence, or may be caused by changing operation of the wind turbine, e.g. grid loss.

It is known that wind turbines generate sound or noise from different sources, e.g. mechanical sources such as drivetrain tonality, and aerodynamic sources from airflow around the rotor blades. The ever-increasing size of wind turbines has led to increasing issues with the noise levels being emitted.

Tonal noise (or tonal audibility) is directed to noise at a specific frequency. In wind turbines this may be correlated with the generator or rotor speed, and may correlate with resonances of the wind turbine drivetrain. That is, noise may be emitted when a wind turbine operates at a particular generator or rotor speed corresponding to a resonance frequency of one or more structural components of the wind turbine.

A known method for reducing such tonal noise is to introduce so-called 'avoidance bands' of operation of the wind turbine, i.e. controlling the wind turbine so that it will not operate in certain rotor speed ranges corresponding to rotor speeds correlated with high levels of tonal noise. However, a disadvantage of such an approach is a loss in efficiency of operation of the wind turbine, e.g. a reduction of produced power, when optimal operation of the turbine would involve a rotor speed in the avoidance band.

Other known approaches for addressing the issue of tonal noise include the installation of tuned mass dampers, or replacing gearboxes with low-vibrating units. However, such approaches are disadvantageous in that provision of the relevant equipment has associated costs, as well as costs associated with downtime of a wind turbine to install/replace such parts.

It is against this background to which the present invention is set.

SUMMARY OF THE INVENTION

The inventor of the present invention has realised that noise emissions—in particular, tonal noise emissions—from a wind turbine are not only correlated to wind turbine rotor/generator speed, but also to the variation of wind turbine rotor/generator speed over time. In particular, the inventor has realised that modifying or perturbing the rotor/generator speed to increase its variation over time can result in reduced noise emissions associated with the wind turbine.

According to an aspect of the present invention there is provided a method of reducing noise emissions of a wind turbine. The method comprises receiving data indicative of wind conditions in the vicinity of the wind turbine. The method comprises determining an operational set point signal in accordance with a desired operation of the wind turbine, the operational set point signal being determined in dependence on the received data. The method comprises applying a perturbation signal to the operational set point signal to obtain a modified operational set point signal. The method comprises controlling operation of the wind turbine using the modified operational set point signal to reduce noise emissions of the wind turbine. The perturbation signal is applied such that the modified operational set point signal has greater temporal variation than the operational set point signal.

The method may be particularly directed at reducing tonal audibility emissions from the wind turbine. Wind turbine tonal audibility may be regarded as a difference between the tonality and the audibility criterion in each wind speed bin, where tonality is a difference between the tone level and the level of the masking noise in a critical band around the tone in each wind speed bin, and the audibility criterion is a frequency-dependent criterion curve determined from listening tests and reflecting the subjective response of a 'typical' listener to tones of different frequencies. The concepts of tonality and audibility are dealt with in IEC 61400-11 Ed. 3 standard.

The method may comprise determining whether application of the perturbation signal is needed in dependence on data indicative of noise emissions of the wind turbine. The method may comprise activating application of the perturbation signal only if it is determined that application of the perturbation signal is needed. Optionally, the data indicative of noise emissions may include the received data indicative of wind conditions.

In some embodiments, determining whether application of the perturbation signal is needed may comprise determining whether an operational parameter of the wind turbine is within a predefined critical range of values. In such embodiments, application of the perturbation signal may be activated only if the operational parameter is determined to be within the prescribed critical range.

In some embodiments, determining whether application of the perturbation signal is needed may comprise determining whether temporal variation of an operational parameter of the wind turbine is below a prescribed threshold variation. In such embodiments, application of the perturbation signal may be activated only if the temporal variation is below the prescribed threshold variation.

Determining temporal variation may comprise determining standard deviation of the operational parameter. The prescribed threshold variation may be a prescribed threshold standard deviation.

The operational parameter may include the operational set point signal.

The operational parameter may include at least one of: wind turbine generator speed; wind turbine power; wind turbine torque; wind turbine tonal audibility; wind speed in the vicinity of the wind turbine; and, wind direction in the vicinity of the wind turbine.

In some embodiments, if it is determined that application of the perturbation signal is not needed, then the method may comprise controlling operation of the wind turbine using the determined operational set point signal.

In some embodiments, if it is determined that the perturbation signal is not needed when application of the perturbation signal is activated, the method may comprise continuing to apply the perturbation signal until a deactivation condition is satisfied. Alternatively, or in addition, if it is determined that the perturbation signal is needed when application of the perturbation signal is deactivated, the method may comprise applying the perturbation signal only if an activation condition is satisfied.

The perturbation signal may be applied such that a temporal mean of the modified operational set point signal is substantially equal to a mean of the operational set point signal.

The perturbation signal may be deterministic. Optionally, the perturbation signal may comprise one, or a combination of, a sine wave signal, a cosine wave signal, a triangular wave signal, and a square wave signal. Optionally, the perturbation signal may be determined based on the received data indicative of wind conditions. Alternatively, the perturbation signal may be a non-deterministic random signal, optionally with a specific temporal variation.

The operational set point signal may be at least one of: a wind turbine generator speed set point signal; and, a wind turbine power set point signal.

In some embodiments, controlling operation of the wind turbine may comprise determining a control output in dependence on the modified operational set point signal. In such embodiments, controlling operation of the wind turbine may comprise using the determined control output to control operation of the wind turbine. Optionally, the control output may include a pitch reference value for controlling pitch of one or more blades of the wind turbine. Optionally, the control output may include a power reference value for controlling power generation of the wind turbine.

According to another aspect of the present invention there is provided a non-transitory, computer-readable storage medium storing instructions thereon that when executed by a processor causes the processor to perform the method described above.

According to another aspect of the present invention there is provided a controller for reducing noise emissions of a wind turbine. The controller is configured to receive data indicative of wind conditions in the vicinity of the wind turbine. The controller is configured to determine an operational set point signal in accordance with a desired operation of the wind turbine, the operational set point signal being determined in dependence on the received data. The controller is configured to apply a perturbation signal to the operational set point signal to obtain a modified operational set point signal, and to control operation of the wind turbine using the modified operational set point signal to reduce noise emissions of the wind turbine. The perturbation signal is applied such that the modified operational set point signal has greater temporal variation than the operational set point signal.

According to another aspect of the present invention there is provided a wind turbine comprising a controller as described above.

BRIEF DESCRIPTION OF THE DRAWINGS

Examples of the invention will now be described with reference to the accompanying figures, in which.

DETAILED DESCRIPTION

Figure 1:
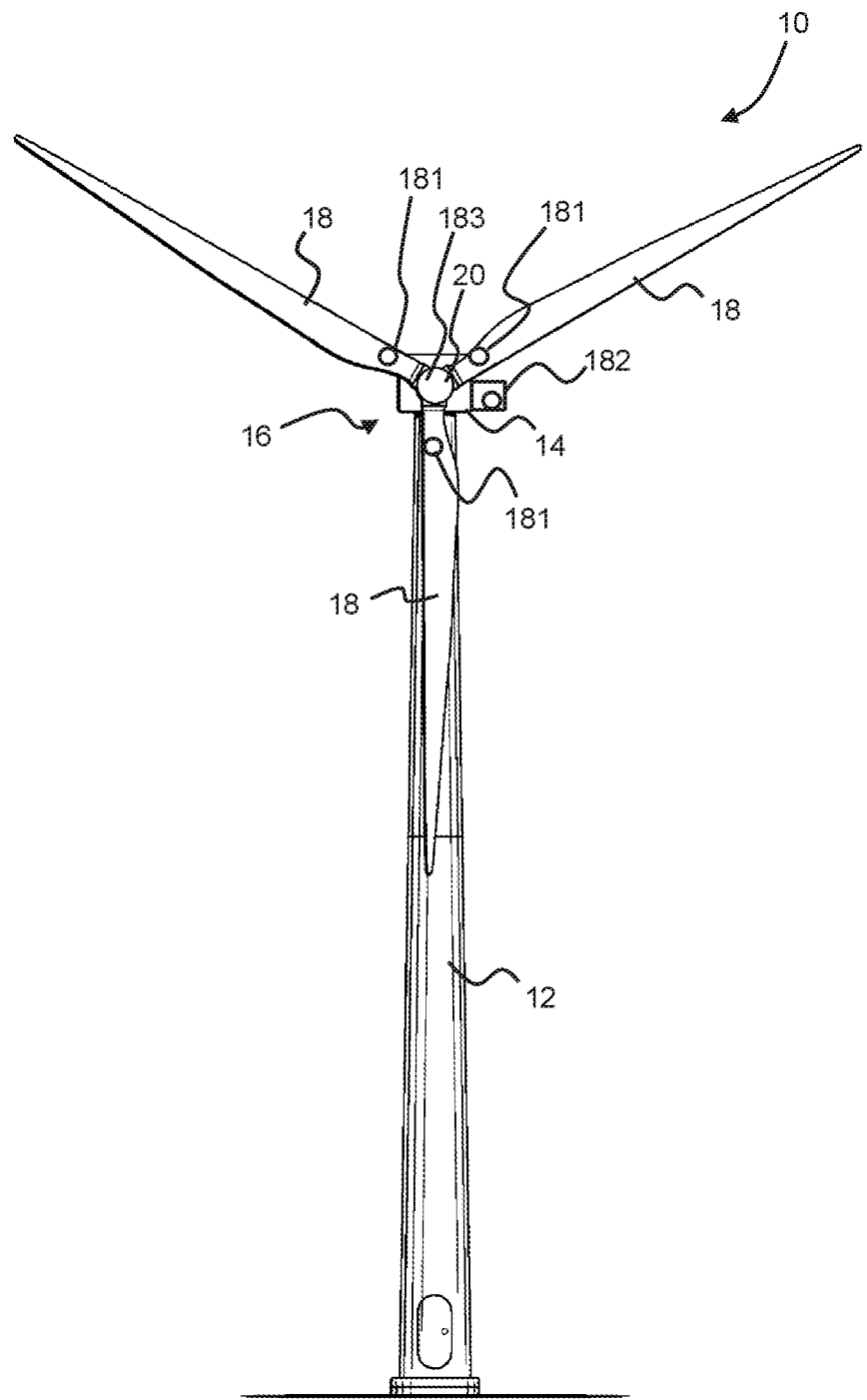
FIG. 1 is a schematic diagram of a wind turbine according to an example of the invention.

FIG. 1 shows a wind turbine 10 in which an example of the invention may be incorporated. The wind turbine 10 comprises a tower 12 supporting a nacelle 14 to which a rotor 16 is mounted. The rotor 16 comprises a plurality of wind turbine blades 18 that extend radially from a hub 20. In this example, the rotor 16 comprises three blades 18 and a single rotor 16, although other configurations including any suitable number of blades and rotors are possible.

The wind turbine 10 may include one or more different sensors for measuring various features of the operation of the turbine 10, and of the conditions, e.g. wind conditions, in the vicinity of the turbine 10. Shown within each blade 18 is an optional blade load sensor 181 (in other examples there may be multiple blade load sensors allowing blade loads to be represented by more than a single variable). The sensing element may be a fibre optic strain gauge, a resistive strain gauge, or any other appropriate detector. An optional rotor wind speed and/or direction detector 182 is also shown—again, this measurement may be performed in several ways as the skilled person will appreciate, one being through a wind vane and an anemometer, and another through LIDAR, as the skilled person will appreciate from the literature of wind turbine design and control. An optional rotational speed sensor 183 is also shown—this may be, for example, in the form of a rotary encoder on a generator shaft of the turbine 10; however, the rotor speed or generator speed may be determined in any suitable manner. Further sensors may additionally or alternatively be included. For instance, an accelerometer for measuring lateral, or side-to-side, oscillations or vibrations of the tower 12 may be included at a suitable location, or sensors for measuring indications of the acceleration values of the wind turbine generator or gearbox. A microphone or other acoustic sensor may be included in the turbine 10, or in the vicinity of the turbine 10, to detects levels of noise emissions generated by the wind turbine 10.

Figure 2:
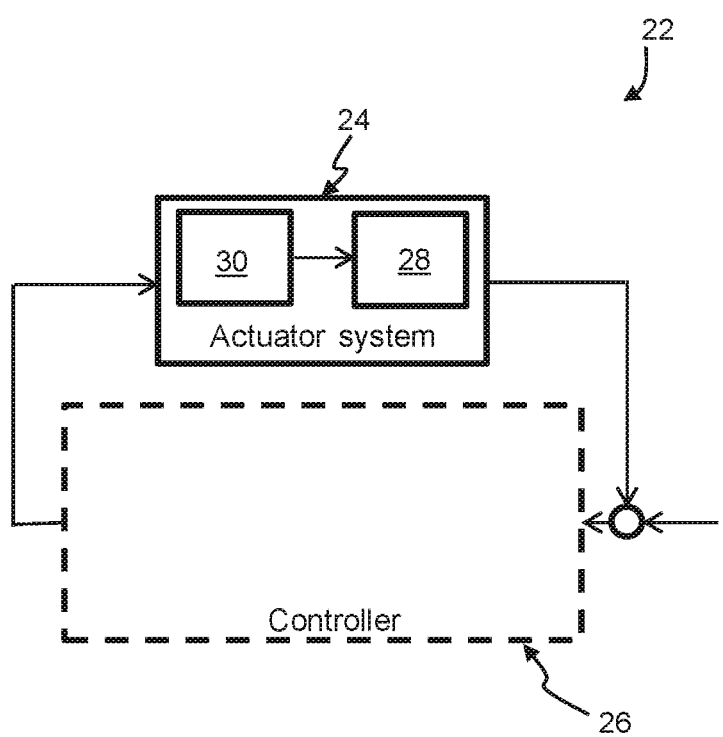
FIG. 2 shows a controller of the wind turbine of FIG. 1, and an actuator system of the wind turbine to be controlled by the controller.

FIG. 2 shows a wind turbine control system 22 in accordance with an example of the invention which may be implemented in the wind turbine 10 of FIG. 1. Here, the control system 22 includes an actuator system 24 that is controlled by a control unit or (overall) controller 26. In this particular example, the actuator system 24 may be, or may comprise, a pitch system for controlling pitch of one or more of the wind turbine blades 18 which may include a hydraulic actuator 28 arranged to adjust blade pitch in a known manner. The actual position of the actuator 28 is controllable by an actuator position control unit 30 which provides a positioning command signal to the hydraulic actuator 28. The controller 26 and actuator system 24 may be replicated for each of the blades 18 of the wind turbine 10 so that the position of each blade 18 may be controlled independently.

The pitch system of the wind turbine 10 is just one example of a wind turbine system that may be controlled. The controller 26 may also be used to control other wind turbine systems and/or components. For instance, the actuator system 24 may be a converter control system where the actuator system 24 may be a power converter of the generation system of the wind turbine 10 that converts AC power delivered by the generator to a variable-frequency AC power output via a DC link in a process known as 'full power conversion', i.e. changing the synchronous speed of the generator independently from the voltage and frequency of the grid.

In one example method of the invention, the pitch of the blades 18 of the wind turbine 10 may be controlled (individually and/or collectively) according to a control strategy to not only maximise energy production and minimise loads, but also to reduce noise emissions, based on the monitored operation of the wind turbine 10. In particular, blade pitch may be controlled to reduce the tonal noise or tonal audibility caused by a build-up of resonance of one or more structural components of the wind turbine 10—e.g. main shaft, tower, etc. —at specific, critical rotor or generator speeds of the wind turbine 10. That is, the pitch is controlled to ensure that prolonged operation of the wind turbine 10 at such a critical speed is avoided. However, unlike previous approaches in which operation of a wind turbine at such a critical rotor speed is prevented, in the method of the invention operation of the wind turbine 10 is controlled to perturb the rotor speed away from, or about, a certain value, e.g. a critical rotor speed. Expressed differently, increased temporal variation of the rotor speed is provided to ensure that prolonged or extended operation at a certain rotor speed, e.g. a critical rotor speed, is avoided. In general, therefore, examples of the invention reside in methods that prevent resonances from building up over time, e.g. breaking the resonances by perturbing the system, or disturbing the stability of the system in some way.

Figure 3:
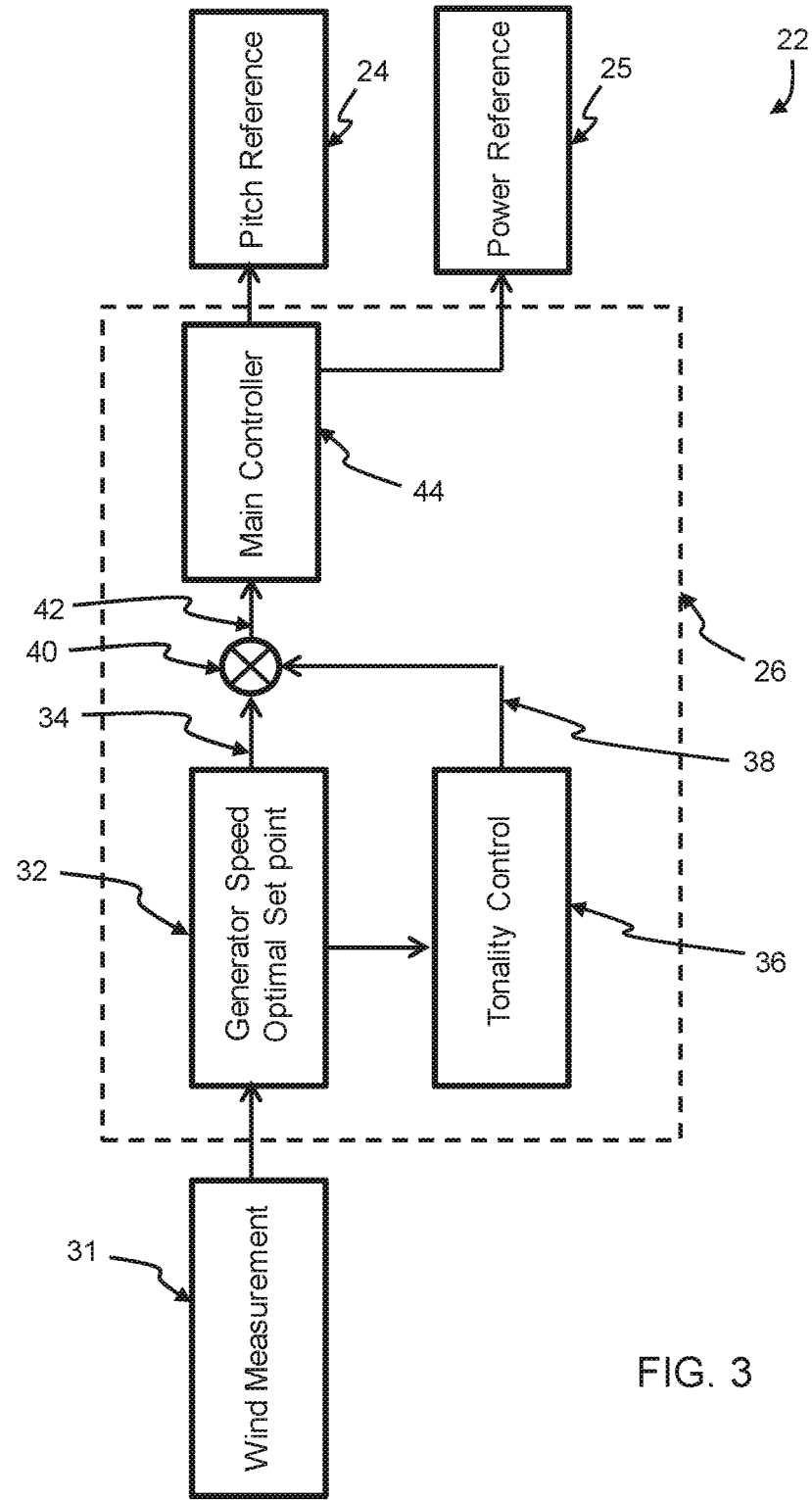
FIG. 3 shows the component parts or modules of the controller of FIG. 2, together with the inputs to, and outputs from, the controller.

A specific example implementing this approach in the controller or control system 26 is shown schematically in FIG. 3. The controller 26 is configured to receive data indicative of wind conditions in the vicinity of the wind turbine 10, e.g. from a wind measurement module or unit 31 as indicated in FIG. 3. Such data may be obtained from any suitable source. For instance, the data may be indicative of a direct measurement of wind conditions, such as wind speed and/or wind direction, e.g. from the rotorwind speed and/or direction detector 182 shown in FIG. 1.

Several functional elements or modules of the controller 26 are shown. A generator (or rotor) speed optimal set point unit 32 receives the wind measurement data from the wind measurement unit 31. The optimal set point unit 32 determines an optimal or desired operational set point signal for the generator speed based on the current wind conditions in order to optimise performance of the wind turbine 10 according to a particular control strategy, e.g. maximise energy production and/or minimise loads. The optimal set point unit 32 then outputs the determined optimal operational set point 34 for the generator speed.

A tonality control unit 36 determines a perturbation signal that is to be applied to, or superimposed on, the determined optimal set point signal 34 in order to reduce tonal noise associated with the wind turbine 10, as will be described in greater detail below. The tonality control unit 36 outputs the determined perturbation signal 38, and the perturbation signal 38 is applied to, or combined with, the determined optimal set point signal 34 at element 40. These signals are combined to obtain a so-called 'modified set point signal' for the generator speed when controlling operation of the wind turbine 10.

FIG. 3 shows the determined modified set point signal 42 as being received by a main controller 44 of the overall controller or control unit 26. The main controller 44 determines outputs that are to be sent to instruct one or more actuation systems of the wind turbine 10 so as to cause the wind turbine 10 to operate in a desired manner. The pitch reference unit 24 and/or a power reference unit 25, receives instructions from the main controller 44 for controlling pitch of the blades 18 and/or power generation by the wind turbine 10, respectively. The outputs determined by the main controller 44 are in particular determined in dependence on the modified operational (generator speed) set point signal 42.

Figure 4:
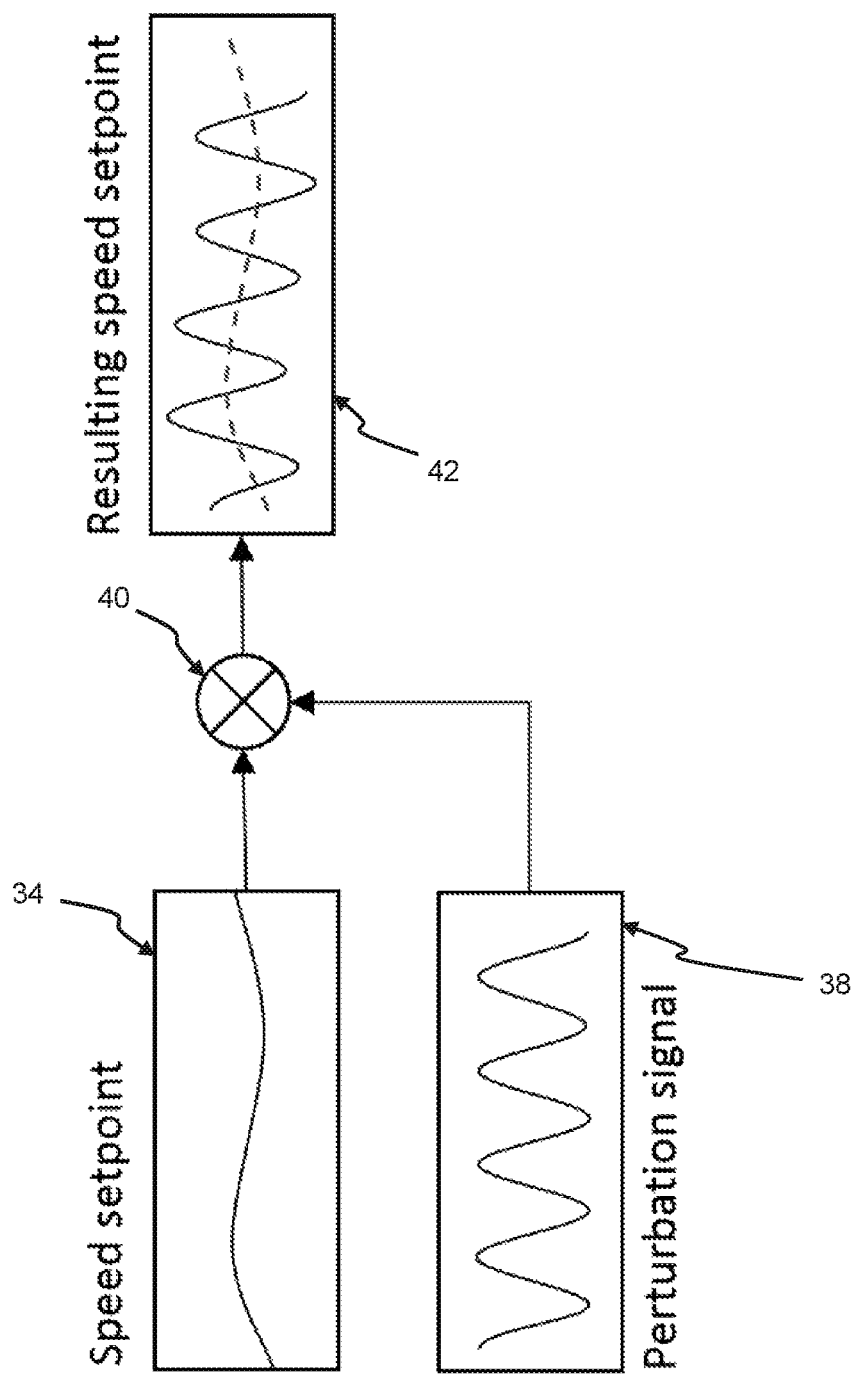
FIG. 4 schematically illustrates how the controller of FIG. 2 perturbs an optimal operational set point signal for the wind turbine in accordance with an example of the invention; and, FIG. 5 shows the steps of a method performed by the controller of FIG. 2 in accordance with an example of the invention.

FIG. 4 shows in greater detail how the perturbation signal 38 is applied to the optimal generator speed set point signal 34 to obtain the modified or resulting generator speed set point signal. In particular, FIG. 4 illustrates an example of the optimal set point signal 34. Specifically, the optimal set point signal 34 is illustrated as a relatively slowly-varying signal over time. As the optimal set point signal 34 is determined in dependence on the wind conditions in the vicinity of the wind turbine 10, a slowly-varying optimal set point signal 34 is indicative of slowly-varying wind conditions. For instance, in such a case the wind speed and/or direction may be substantially constant, or varying over a relatively long time period. Such wind conditions may include relatively benign wind conditions, but not include turbulent wind conditions. Specifically, temporal variation of the optimal wind speed signal may be on the same, or a similar, time scale to temporal variation of the wind conditions (e.g. speed, direction, etc.).

FIG. 4 also illustrates an example of the perturbation signal 38. Specifically, the perturbation signal 38 is illustrated as having a temporal variation that is greater than that of the optimal set point signal 34. That is, variation of the perturbation signal 38 occurs on a faster time scale that that of the optimal set point signal 34. This means that, when the perturbation signal 38 is applied to the optimal set point signal 34 at element 40, the resulting set point signal 42 is a signal that has greater temporal variation than the optimal set point signal 34.

The perturbation signal 38 may be any suitable signal that perturbs the optimal set point about, or away from, a certain (optimal) generator speed set point value or range of values. The perturbation signal 38 may be symmetric about a certain generator speed value, e.g. zero generator speed so that a mean value of the modified signal 42 is substantially equal to a mean value of the optimal signal 34. The particular form of the perturbation signal may be random or may be deterministic. In the example illustrated in FIG. 4, the perturbation signal is in the form of a sine wave signal; however, the signal may take any suitable form, e.g. a cosine wave signal, a triangular wave signal, and a square wave signal, either alternatively or in any suitable combination. The amplitude, period and/or particular form of the perturbation signal 38 may be determined based on the detected wind conditions or on the determined optimal set point 34. For instance, there may be certain wind speeds or certain optimal generator speed set points—e.g. those which correspond to increased levels of wind turbine tonal noise—where a perturbation signal having a greater amplitude or greater temporal variation may be desired. In general, it may be desired to perturb the optimal set point by the minimum possible amount that still achieves the desired effect of reduced tonal noise so as to minimise the disturbance on overall operation of the wind turbine.

In the example illustrated in FIG. 4, the modified set point signal 42 has a greater temporal variation and a greater amplitude than the optimal set point signal (shown as a dashed line), but the mean value of the modified set point signal 42 (over time) is substantially equal to that of the optimal set point signal 34. One way in which to increase the temporal variation of the optimal set point signal 34 is to increase its standard deviation: in the described example, the modified set point signal 42 has a greater standard deviation than the optimal set point signal 34.

The perturbation signal 38 may be determined and applied to the optimal set point signal 34 in all wind conditions and for all optimal generator speed set point values. However, application of the perturbation signal 38 may be of particular benefit in certain wind conditions and/or for certain values of the optimal generator speed set point 34. Specifically, application of the set point signal may be of particular use when the wind conditions mean that the determined optimal generator speed set point is a value, or range of values, of the generator speed that corresponds to operation of the wind turbine 10 that results in increased levels of tonal noise. As mentioned above, wind turbine tonal noise may result from prolonged or extended operation of the wind turbine 10 at a critical generator speed that corresponds to resonance frequency operation of one or more structural components of the wind turbine 10, such that excitation levels at the resonance frequency are allowed to build. In this respect, relatively stable wind conditions—which correspond to a relatively stable, or slowly-varying, optimal set point—may be the conditions in which application of the perturbation signal 38 is needed or desired.

The controller 26 may therefore optionally be configured to determine whether perturbation of the optimal set point 34 is needed prior to determining or applying the perturbation signal 38. In particular, the controller 26 may determine that utilisation of the perturbation signal 38 is needed only when optimal operation of the wind turbine 10 would result in increased levels of tonal noise. The determination as to whether the perturbation signal is needed may therefore be based on data indicative of noise emissions of the wind turbine 10. Such data may be obtained from one or more different suitable sources. For instance, the data indicative of wind conditions from the wind measurement unit 31 may be used as the noise emission data. In particular, it may be known that certain wind speeds correspond to (optimal) operation of the wind turbine 10 that results in increased tonal audibility of the wind turbine 10, and therefore it may be determined application of the perturbation signal is needed for such wind speeds. As mentioned, tonal noise may build when there is extended operation of the wind turbine 10 at certain critical generator speeds, and so the variance—as well as the absolute value—of the wind speed may be used in determining whether to apply the perturbation signal, e.g. stable or slowly-varying wind speed may mean that application of the perturbation is needed to guard against a build-up of resonance frequency excitation of structural components over time. In this way, the controller 26 may activate determination and/or application of the perturbation signal 38 only if it is determined that application of the perturbation signal 38 is needed.

The data indicative of noise emissions of the wind turbine 10—on which determination of perturbation signal activation is based—may include a direct measurement of the noise being emitted by the wind turbine 10. For instance, such a direct measurement may be received from a microphone or other acoustic sensor in the turbine 10, or in the vicinity of the turbine 10. The controller 26 may then determine that activation of the perturbation signal 38 is needed when the detected emitted noise from the wind turbine 10 exceeds a threshold noise level. The data indicative of noise emissions of the wind turbine 10 could also be based on measurements associated with wind turbine operation, such as generator/rotor speed, power generation levels, or torque. It may be that certain levels or values of these parameters are known to correlate with, or result in, high levels of tonal noise, and so activation of the perturbation signal 38 could be based on one of more of these parameters being at certain levels, perhaps for a certain amount of time.

More generally, therefore, determining whether application of the perturbation signal 38 is needed may include determining whether an operational parameter of the wind turbine 10 is within a predefined critical range of values that may result in high levels of tonal noise. Additionally, or alternatively, the determination may include determining whether the temporal variation, e.g. the standard deviation, of the operational parameter is less a threshold variation level. The perturbation signal 38 may then be activated only if the operational parameter is determined to be within the prescribed critical range and/or below the threshold variation level. The operational parameter could be one or more of generator speed, wind turbine power, wind turbine torque, wind turbine tonal noise or audibility, wind speed, and wind direction. Application of the perturbation signal 38 may then be activated only if the operational parameter is determined to be within the prescribed critical range. Alternatively, or in addition, determining whether application of the perturbation signal 38 is needed may include determining whether temporal variation of one of the wind turbine operational parameters is below a prescribed threshold variation, where application of the perturbation signal 38 may be activated only if the temporal variation is below the prescribed threshold variation. When the perturbation signal 38 is de-activated, or it is determined that it is not needed, operation of the wind turbine 10 may be controlled using the optimal set point signal 34, i.e. the main controller 44 receives the optimal set point signal 34 for use in determining a control output for controlling blade pitch.

In one example, a standard deviation of the generator speed reference is measured and tracked as a moving average, i.e. the average standard deviation is monitored over a certain time period, e.g. 10-second averages. In this way, the moving average value is maintained to track to development of the generator speed. It may be that if the (mean) standard deviation is below a set threshold and the average generator speed reference is within a prescribed threshold speed range, then control to reduce tonal noise emissions is activated, e.g. the perturbation signal 38 is activated.

In examples in which application of the perturbation signal is activated or de-activated based on whether predetermined conditions are met, e.g. whether tonal noise levels are above a certain level, further considerations may be made to guard against frequent activation or de-activation of such tonality control measures. For instance, a hysteresis loop may be utilised that sets different conditions for activation and de-activation to avoid frequent switching between the two when operation of the wind turbine 10 is in the vicinity of a threshold defining operation with and without the perturbation signal. Another option would be to keep applying the perturbation signal 38 for at least a predetermined amount of time after it is activated even if it is determined during the predetermined amount of time that the perturbation signal 38 is no longer needed. The perturbation signal 38 could also continue to be applied for a predetermined amount of time after it is determined that it is no longer needed. A similar approach could additionally or alternatively be applied after de-activating the perturbation signal 38. More generally, it may be that the perturbation signal 38 will continue to be applied until a de-activation condition is satisfied, where such a condition may not just be based on the noise levels being generated, but also on factors to ensure that repeated switching between activation and de-activation is avoided. A similar activation condition may be used when the perturbation signal 38 is de-activated.

Figure 5:
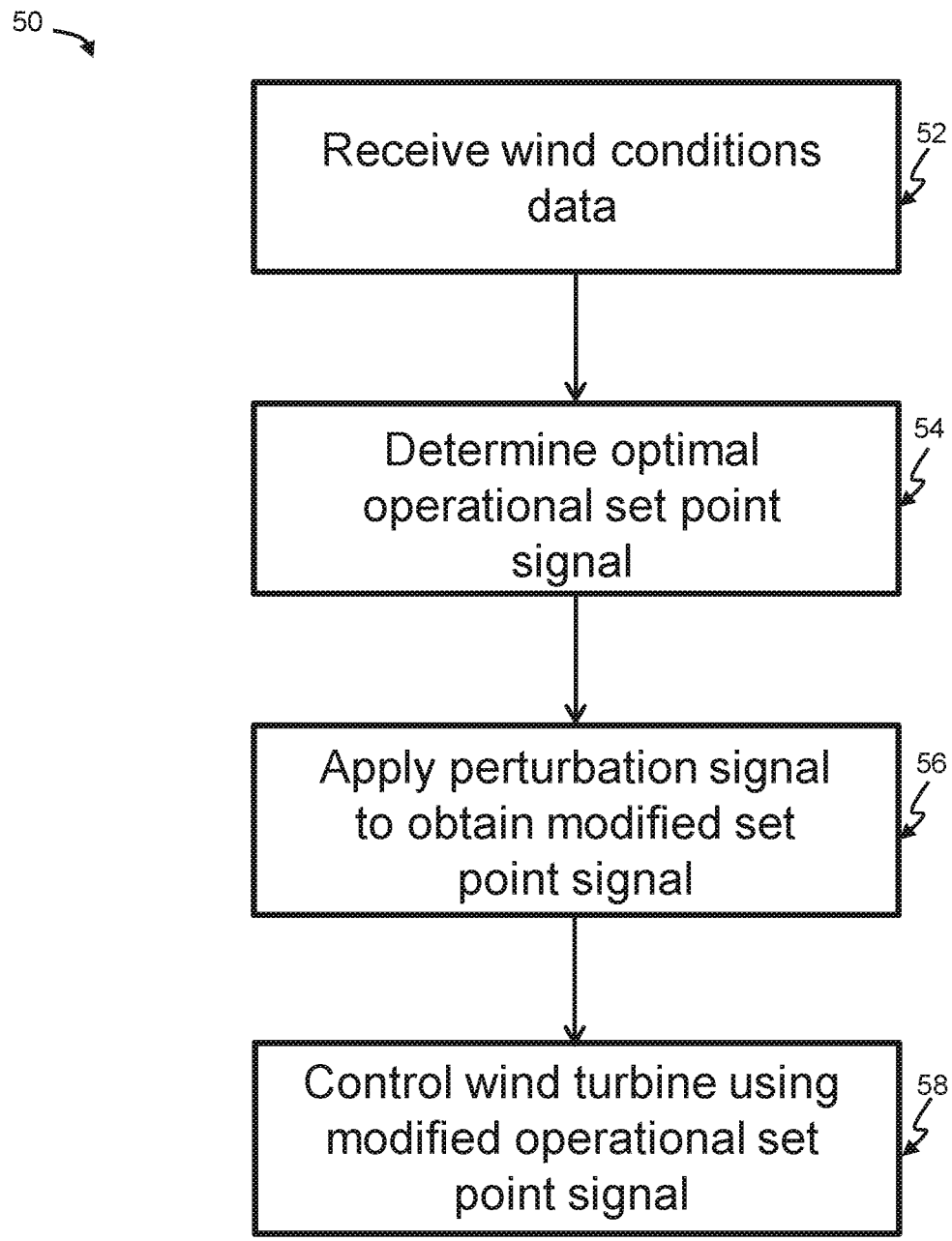

FIG. 5 summarises the steps of a method 50 in accordance with an embodiment of the invention. At step 52, data indicative of wind conditions in the vicinity of the wind turbine 10 is received. This could be data received via a direct wind measurement or could be determined based on some other measurement. For instance, blade load measurements using the blade load sensors 181 could be used for this purpose.

At step 54, an operational set point signal 34 is determined in accordance with a desired or optimal operation of the wind turbine 10, e.g. according to a desired control strategy to maximise efficiency and/or minimise component loading. The operational set point signal 34—which could be a generator speed set point, for instance—is determined in dependence on the received wind conditions data.

At step 56, a perturbation signal 38 is applied to the operational set point signal 34 to obtain a modified operational set point signal 42. The perturbation signal 38 is applied such that the modified operational set point signal 42 has greater temporal variation—e.g. greater standard deviation over a certain time period—than the operational set point signal 34. Optionally, a determination as to whether the perturbation is needed is performed before application of it is performed. Such a determination may be based on the actual or expected levels of tonal noise from the wind turbine, and application of the perturbation signal 38 may be activated only if the wind turbine tonal noise levels are above a certain level.

At step 58, operation of the wind turbine 10 may be controlled using the modified operational set point signal 42 to reduce noise emissions of the wind turbine 10. In a case where the perturbation signal is only activated in certain conditions, then operation of the wind turbine 10 may be controlled using the optimal operational set point signal 34 when the perturbation signal is de-activated, i.e. when the perturbation signal 38 is determined not to be needed.

Many modifications may be made to the described examples without departing from the scope of the appended claims.

In the above-described example, optimal and modified operational set point signals are determined for the generator or rotor speed of the wind turbine. However, in different examples, operational set point signals for different wind turbine operational parameters may alternatively or additionally be determined and used to control operation of the wind turbine. For instance, an optimal and modified wind turbine power set point signal may be determined and used.

In the above-described example, the optimal operational set point signal is determined (based on the detected wind conditions) and then a perturbation signal is applied to obtain the modified operational set point signal. However, in different examples it may be that separate determination of the optimal set point signal and perturbation signal is not performed, and instead the modified set point signal is determined directly (taking into account the contributions from the optimal and perturbation signals).

Examples of the invention could include implementing a perturbation to the generator speed reference so that it does not operate on top of a resonance while also utilising a lookup table (with speed and power constraints) to avoid high levels of excitation that are driven by torque loads caused by powertrain excitations.

Examples of the invention could be used as part of a model predictive control routine for controlling operation of the wind turbine. In particular, the wind turbine operation could be perturbated using a cost function to avoid regions of operation with resonance build-up.

Specifically, the cost function could be such that temporal variation, e.g. standard deviation, of the generator speed reference is maintained above a threshold level, at least in certain operating conditions. In essence, the model predictive controller could be configured to such that if wind conditions are stable then the controller acts to increase temporal variation of the wind turbine operation.

Examples of the invention are advantageous in that noise emissions from a wind turbine—in particular, levels of tonal noise—can be reduced without significantly negatively impacting the performance of the wind turbine, i.e. power production levels. This is because the wind turbine can still be operated in an optimal (or near optimal) manner relative to a control strategy, e.g. maximising energy production, while tonal noise is reduced. In particular, instead of needing to avoid optimal regions of operation in order to reduce tonal noise emissions, operation of the wind turbine can be perturbed about optimal operating regions, e.g. a generator speed reference, to prevent build-up of resonances arising from slowly-varying (stable) operation in certain operating regions, but while still maintaining optimal wind turbine operation, at least one average. Examples of the invention advantageously mimic wind turbine operation in unstable wind conditions, i.e. when the generator speed reference has a greater degree of temporal variation to account for the changing conditions, and may readily be applied as over-the-air updates.

The invention claimed is:

1. A method of reducing noise emissions of a wind turbine, the method comprising:
    receiving data indicative of wind conditions in the vicinity of the wind turbine;
    determining an operational set point signal in accordance with a desired operation of the wind turbine, the operational set point signal being determined in dependence on the received data;
    applying a perturbation signal to the operational set point signal to obtain a modified operational set point signal; and,
    controlling operation of the wind turbine using the modified operational set point signal to reduce noise emissions of the wind turbine,
    wherein the perturbation signal is applied such that a signal characteristic has greater temporal variation in the modified operational set point signal than in the operational set point signal.

2. The method according to claim 1, comprising determining that application of the perturbation signal is needed in dependence on data indicative of noise emissions of the wind turbine, and activating application of the perturbation signal only when it is determined that application of the perturbation signal is needed, wherein the data indicative of noise emissions includes the received data indicative of wind conditions.

3. The method according to claim 2, wherein determining that application of the perturbation signal is needed comprises determining that an operational parameter of the wind turbine is within a predefined critical range of values, and wherein application of the perturbation signal is activated only when the operational parameter is determined to be within the prescribed critical range.

4. The method according to claim 3, wherein the operational parameter includes the operational set point signal.

5. The method according to claim 3, wherein the operational parameter includes at least one of: wind turbine generator speed; wind turbine power; wind turbine torque; wind turbine tonal audibility; wind speed in the vicinity of the wind turbine; and, wind direction in the vicinity of the wind turbine.

6. The method according to claim 2, wherein determining that application of the perturbation signal is needed comprises determining that temporal variation of an operational parameter of the wind turbine is below a prescribed threshold variation, and wherein application of the perturbation signal is activated only when the temporal variation is below the prescribed threshold variation.

7. The method according to claim 6, wherein determining temporal variation comprises determining a standard deviation of the operational parameter, and wherein the prescribed threshold variation is a prescribed threshold standard deviation.

8. The method according to claim 2, wherein when it is determined that application of the perturbation signal is not needed, then the method comprises controlling operation of the wind turbine using the determined operational set point signal.

9. The method according to claim 2, wherein: when it is determined that the perturbation signal is not needed when application of the perturbation signal is activated, the method comprises continuing to apply the perturbation signal until a deactivation condition is satisfied; or, when it is determined that the perturbation signal is needed when application of the perturbation signal is deactivated, the method comprises applying the perturbation signal only when an activation condition is satisfied.

10. The method according to claim 1, wherein the perturbation signal is applied such that a temporal mean of the modified operational set point signal is substantially equal to a mean of the operational set point.

11. The method according to claim 1, wherein the perturbation signal is deterministic, wherein the perturbation signal comprises one, or a combination of, a sine wave signal, a cosine wave signal, a triangular wave signal, and a square wave signal, wherein the perturbation signal is determined based on the received data indicative of wind conditions.

12. The method according to claim 1, wherein the operational set point signal is at least one of: a wind turbine generator speed set point signal; and, a wind turbine power set point signal.

13. The method according to claim 1, wherein controlling operation of the wind turbine comprises: determining a control output in dependence on the modified operational set point signal; and, using the determined control output to control operation of the wind turbine, wherein the control output is a pitch reference value for controlling pitch of one or more blades of the wind turbine.

14. The method according to claim 1, wherein the signal characteristic is a standard deviation.

15. The method according to claim 1, wherein the signal characteristic is an amplitude.

16. The method according to claim 1, wherein the operational set point signal is a wind turbine generator speed set point signal and the signal characteristic is a standard deviation, and wherein the method further comprises:

tracking an average of the standard deviation over a time period;

determining that the average of the standard deviation is below a set threshold and an average generator speed reference is within a prescribed threshold speed range, and wherein application of the perturbation signal is activated only when it is determined that the average of the standard deviation is below the set threshold and the average generator speed reference is within the prescribed threshold speed range.

17. The method according to claim 1, wherein the operational set point signal is a wind turbine generator speed set point signal and the perturbation signal is applied to the wind turbine generator speed set point signal so as not to operate on top of a resonance frequency one or more structural components of the wind turbine.

18. The method according to claim 1, wherein the operational set point signal is a wind turbine generator speed set point signal and the modified operational set point signal is a modified wind turbine generator speed set point signal.

19. A controller for reducing noise emissions of a wind turbine, the controller being configured to:

receive data indicative of wind conditions in the vicinity of the wind turbine;

determine an operational set point signal in accordance with a desired operation of the wind turbine, the operational set point signal being determined in dependence on the received data;

apply a perturbation signal to the operational set point signal to obtain a modified operational set point signal; and, control operation of the wind turbine using the modified operational set point signal to reduce noise emissions of the wind turbine, wherein the perturbation signal is applied such that a signal characteristic has greater temporal variation in the modified operational set point signal than in the operational set point signal.

20. A wind turbine comprising:

a tower;

a nacelle disposed on the tower; and a controller, for reducing noise emissions of the wind turbine, the controller being configured to:

receive data indicative of wind conditions in the vicinity of the wind turbine;

determine an operational set point signal in accordance with a desired operation of the wind turbine, the operational set point signal being determined in dependence on the received data;

apply a perturbation signal to the operational set point signal to obtain a modified operational set point signal; and control operation of the wind turbine using the modified operational set point signal to reduce noise emissions of the wind turbine, wherein the perturbation signal is applied such that a signal characteristic has greater temporal variation in the modified operational set point signal than in the operational set point signal.

* * * * *